Figure 1:
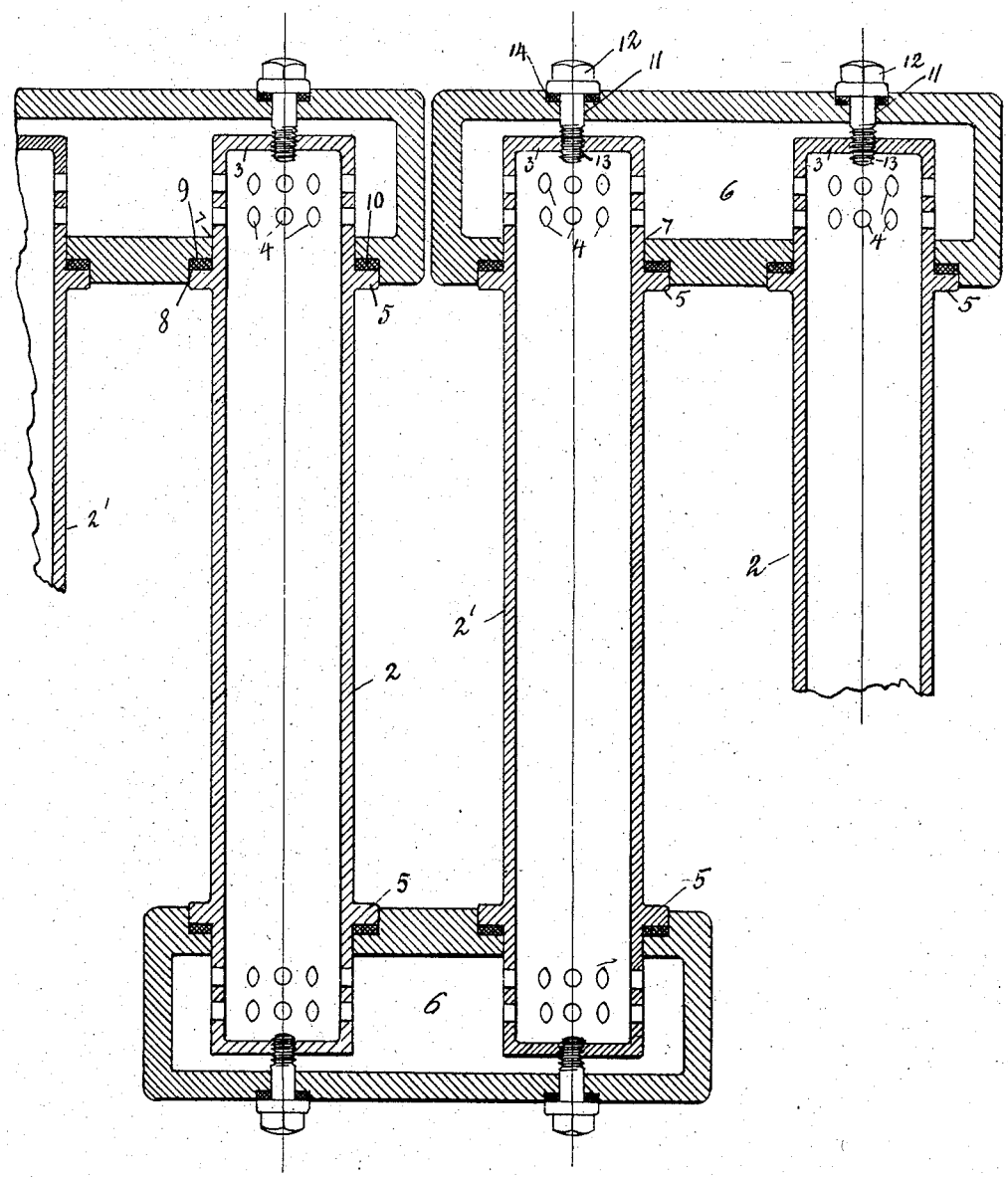

No. 773,106. PATENTED OCT. 25, 1904.
H. STIER.
PIPE JOINT.
APPLICATION FILED JUNE 6, 1903.
NO MODEL. 3 SHEETS—SHEET 1.

WITNESSES: INVENTOR.
Herman Stier
BY
ATTORNEY

No. 773,106. PATENTED OCT. 25, 1904.
H. STIER.
PIPE JOINT.
APPLICATION FILED JUNE 6, 1903.
NO MODEL. 3 SHEETS—SHEET 2.
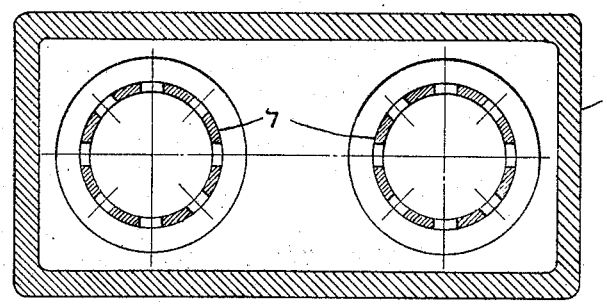
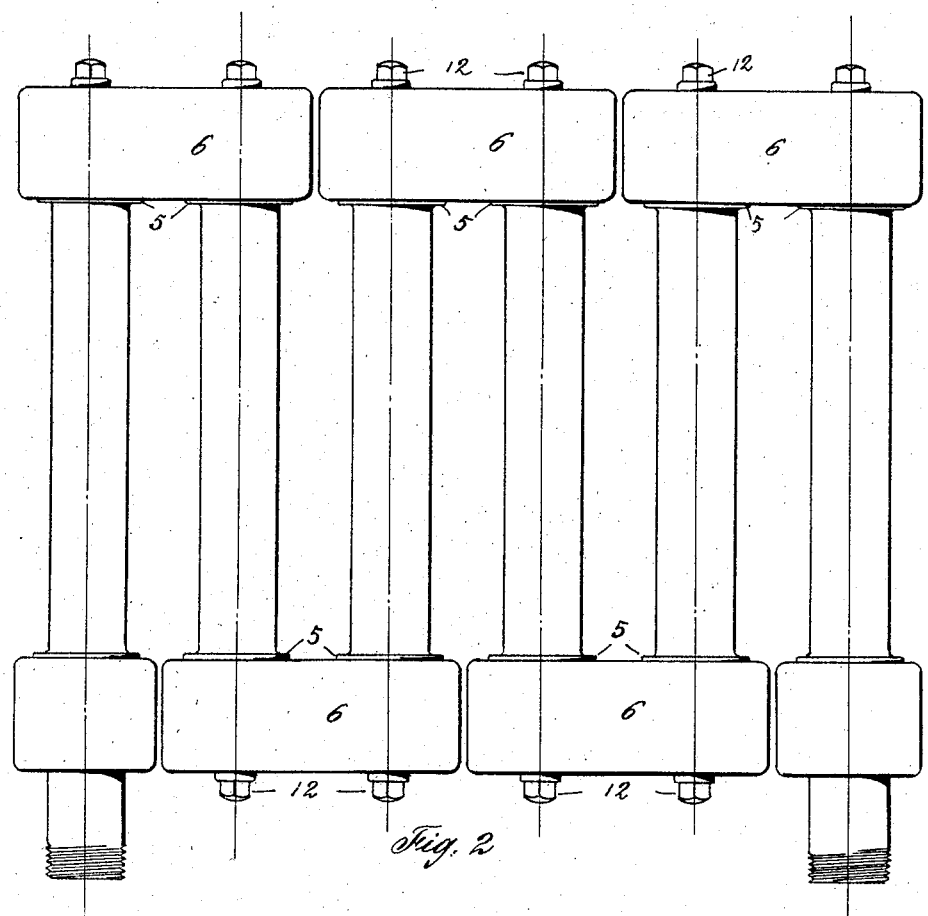
WITNESSES:
Edgar J. Stewart.
Wm. M. Kingsley.
INVENTOR
Herman Stier
BY
Robt. Keith
ATTORNEY

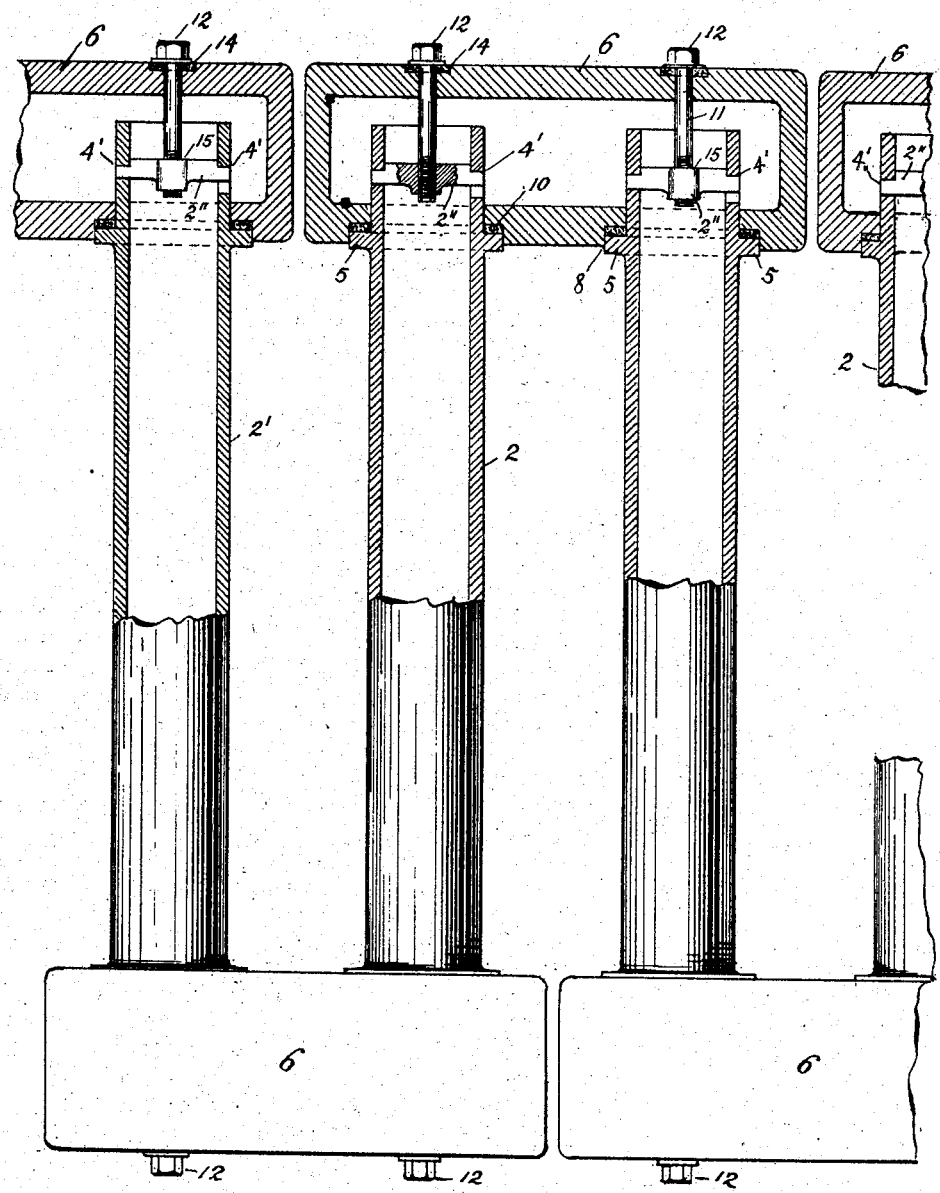

No. 773,106.  Patented October 25, 1904.

UNITED STATES PATENT OFFICE.

HERMAN STIER, OF CHICAGO, ILLINOIS.

PIPE-JOINT.

SPECIFICATION forming part of Letters Patent No. 773,106, dated October 25, 1904.

Application filed June 6, 1903. Serial No. 160,302. (No model.)

*To all whom it may concern:*

Be it known that I, HERMAN STIER, a citizen of the United States, residing at Chicago, in the county of Cook and State of Illinois, have invented certain new and useful Improvements in Pipe-Joints, of which the following is a specification.

This invention relates to fluid-circulating systems, and has particular reference to connections for establishing communication between a series of individual pipes occupying different planes.

The object of the invention is to provide a practical, simple, efficient, and liquid-tight system for circulating ammonia, brine, and other fluids, which may be quickly and easily taken apart for cleaning and other purposes and as readily assembled.

Another object of the invention is to provide a system of joints which may be made positively air and liquid tight at small cost and with a minimum expenditure of time and labor.

Another object of the invention is to provide a connection which shall be yielding and permit of the shifting of the relative positions of the connected pipes.

The invention consists generally in an inclosing box for the ends of adjacent pipes and means for securing said box and pipes together.

The invention further consists in the combination, with a plurality of pipes closed at their ends, of a box inclosing said ends and constituting a conduit therebetween and suitable pipe-openings into said box; and the invention further consists in the novel details of construction hereinafter referred to in detail, illustrated in the drawings, and incorporated in the claims.

Referring to the drawings, Figure 1 is a vertical section through a part of a circulating system embodying my invention. Fig. 2 is an exterior view of a series of pipes and connections, and Fig. 3 is an enlarged view representing a horizontal section through one of the connecting-joints and conduit. Fig. 4 is a partly-sectional elevation showing a modification of my invention.

In the drawings, 2 2' represent the pipes, each of which has an end wall 3, a series of lateral apertures 4, and a ring or flange 5 at the connecting-joint. The latter consists of a preferably box-form structure 6, having apertures 7 for the pipes 2. The apertures 7 are preferably counterbored to provide seats 8 for the flanges or rings 5, between which and the shoulders 9 of the counterbores fiber rings or gaskets 10 are placed. Opposite the pipe-apertures 7 are small bolt-holes 11 for the threaded bolts 12, engaging screw-threaded apertures 13 in the end walls 3. Between the heads of the bolts and the box 6 gaskets 14 are placed, for which suitable counterbores in the box are also provided, as shown.

From the foregoing description the operation of my invention will be obvious, each box 6 providing a joint for the adjacent ends of pipes 2 2' as well as a conduit between the apertures 4. The bolts 12 exert a direct pull to draw the rings 5 tightly against the gaskets and at the same time pack the bolt-openings tightly against leakage. The countersunk apertures for the gaskets prevent the latter from spreading and facilitate a perfectly tight joint without the necessity of tightening the bolts very hard. The simple bolt-and-nut engagement between the ends of pipes and the boxes is at once both very effective and simple and easy in its operation. A series of pipes may be quickly assembled or taken apart by unskilled help, whereas in the more common constructions the joints are usually such as to require experienced or expert workmanship. My invention also provides for great flexibility in a circulatory system, and the series of pipes may be relatively shifted in vertical or parallel planes while in operation as fluid-conduits without endangering the integrity of the joint or joints.

In practice it is often found necessary to twist the joints in order to change the positions of the pipes, and my invention is highly susceptible to such operations. The boxes 6 embody the very simplest possible form of construction. They may be cast at a small cost and do not require a nice or exact adjustment, the powerful and positive engagement of pipes and bolts, in combination with the gaskets, being adapted to compensate for slight irregularities of surface. Again, no frictional or twisting strain is imposed upon the gaskets 10 in effecting the coupling, as the latter are made tight through straight pressure as opposed to all forms of joints where the gasket is interposed between parts which must be turned upon or relatively to each other in order to tighten the engaging threads.

As illustrated in Fig. 4, other means than the threaded bolt 12 in engagement with the wall 3 may be provided for drawing the parts together—as, for instance, a pin or rod 2'', extending through opposite apertures 4', similar to apertures 4, in which case the said threaded portion would engage a threaded aperture 15 in each of the rods 2'', which would take the places of the closed ends 3 of the pipes. In that event the pipe could be open at its end, as shown in Fig. 4, instead of having the wall 3 and would require only two apertures 4 or sufficient to support the end of the rod or pin. I therefore do not wish to confine my invention to the exact method shown for drawing the box against the gasket 10 and flange or ring 5, this feature being susceptible of numerous modifications without departing from the spirit of my invention.

Having thus described my invention, I claim as new and desire to secure by Letters Patent—

1. The combination of a plurality of hollow boxes movable angularly with relation to each other in two parallel planes, with a series of parallel pipes connecting said boxes and swivel-joints for securing said boxes and pipes together constructed and arranged to permit the boxes to be moved relatively to the pipes in planes at right angles to the axes of the pipes.

2. The combination of two parallel series of hollow boxes, each series of boxes arranged in substantially the same plane, and movable angularly with relation to each other, with a plurality of parallel pipes communicating with the interior of said boxes, each pipe communicating with the opposite ends of two boxes in both of said parallel series and means for securing said pipes to said boxes steam-tight and rotatively relatively to each other, all of said boxes and pipes forming one continuous conduit.

3. The combination of two series of hollow boxes movable angularly in one plane and placed end to end in each series and the adjacent ends of each series occupying substantially a plane intersecting the middle portion of a box in the other series, with a plurality of pipes connecting said boxes, said pipes being arranged in pairs, each pair opening into the opposite ends of each box of one series of boxes and into adjacent ends of different boxes in the other series of boxes.

4. The combination of a plurality of hollow boxes arranged in one plane with a similar series of boxes arranged in another plane, a series of parallel straight pipes between said boxes opening into the opposite ends of each box in one plane and into the adjacent ends of separate boxes in the other plane, and means for securing said boxes and pipes together to form one continuous conduit, whereby said pipes may be moved parallel and said boxes moved angularly with relation to each other, each of said series of boxes providing concentric conduits at right angles to the pipe-conduits.

5. The combination of hollow boxes and a series of parallel pipes arranged in pairs, each pair coupled together through one of said boxes, and each pipe of said pair having its opposite end similarly coupled to a separate box communicating with an adjacent pipe, with means for connecting all of said pipes to their respective boxes whereby said pairs of pipes may be moved parallel relatively to each other.

6. The combination of a series of parallel pipes arranged in pairs, a series of boxes each connecting a pair of pipes at one end, said boxes movable angularly with relation to each other in a single plane, with a similar series of boxes each connecting a pipe of one pair to a pipe of another pair at their opposite ends, means for rotatively securing the ends of said pipes in said boxes, said ends projecting into said boxes and having a plurality of holes communicating with the interior of said boxes.

In testimony whereof I have hereunto set my hand in the presence of two subscribing witnesses.

HERMAN STIER.

Witnesses:
 ROBT. KLOP,
 LULU E. MCCORMICK.